(12) United States Patent
Kang et al.

(10) Patent No.: US 9,042,484 B2
(45) Date of Patent: May 26, 2015

(54) METHOD AND APPARATUS OF TRANSMITTING TRAINING SIGNAL IN WIRELESS LOCAL AREA NETWORK SYSTEM

(75) Inventors: Byeong Woo Kang, Anyang-si (KR); Dong Wook Roh, Anyang-si (KR); Yong Ho Seok, Anyang-si (KR); Yu Jin Noh, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 930 days.

(21) Appl. No.: 12/965,635

(22) Filed: Dec. 10, 2010

(65) Prior Publication Data

US 2011/0142020 A1      Jun. 16, 2011

Related U.S. Application Data

(60) Provisional application No. 61/285,524, filed on Dec. 10, 2009.

(51) Int. Cl.
*H04L 5/00*       (2006.01)
*H04W 99/00*   (2009.01)
*H04W 84/12*   (2009.01)

(52) U.S. Cl.
CPC ............. *H04W 99/00* (2013.01); *H04L 5/0048* (2013.01); *H04W 84/12* (2013.01)

(58) Field of Classification Search
CPC ..... H04L 5/0048; H04L 5/005; H04L 5/0005; H04L 5/0007; H04L 5/0023
See application file for complete search history.

(56) References Cited

U.S. PATENT DOCUMENTS

| 7,599,420 | B2 | 10/2009 | Forenza et al. |
| 8,437,440 | B1 * | 5/2013 | Zhang et al. ................. 375/366 |
| 8,571,010 | B1 * | 10/2013 | Zhang et al. ................. 370/351 |
| 2007/0104089 | A1 | 5/2007 | Mujtaba |
| 2009/0046765 | A1 | 2/2009 | Xia et al. |
| 2010/0046656 | A1 * | 2/2010 | van Nee et al. ............... 375/267 |

(Continued)

FOREIGN PATENT DOCUMENTS

| EP | 1542419 | 6/2005 |
| KR | 10-2006-0048988 | 5/2006 |

(Continued)

OTHER PUBLICATIONS

P802.11n/D3.00, Part 11, Amendment 4: Enhancements for Higher Throughput, Sep. 2007.*

(Continued)

*Primary Examiner* — Aristocratis Fotakis
(74) *Attorney, Agent, or Firm* — Lee, Hong, Degerman, Kang & Waimey

(57) ABSTRACT

A method of transmitting a training signal in a Wireless Local Area Network (WLAN) system includes generating one or more first training signals for a first destination station and one or more second training signals for a second destination station by applying a mapping matrix P to a training signal generation sequence, mapping the first training signals and the second training signals to a plurality of antennas according to an antenna mapping matrix, and performing Inverse Fast Fourier Transform (IFFT) on each of the first training signals and the second training signals mapped to the plurality of antennas and transmitting the training signals through the plurality of antennas.

10 Claims, 12 Drawing Sheets

(56) References Cited

U.S. PATENT DOCUMENTS

| | | | |
|---|---|---|---|
| 2010/0086013 A1* | 4/2010 | Pare et al. ..................... | 375/219 |
| 2010/0111220 A1* | 5/2010 | Rouquette-Leveil et al. | 375/295 |
| 2010/0260159 A1* | 10/2010 | Zhang et al. ................. | 370/338 |
| 2011/0002219 A1* | 1/2011 | Kim et al. ..................... | 370/203 |
| 2011/0002319 A1* | 1/2011 | Husen et al. .................. | 370/338 |
| 2011/0013532 A1* | 1/2011 | Wu et al. ....................... | 370/252 |
| 2011/0096797 A1* | 4/2011 | Zhang et al. ................. | 370/474 |
| 2011/0188482 A1* | 8/2011 | Vermani et al. .............. | 370/338 |

FOREIGN PATENT DOCUMENTS

| | | |
|---|---|---|
| KR | 10-2008-0089465 | 10/2008 |
| RU | 2008109247 | 10/2009 |
| WO | 2009/109894 A1 | 9/2009 |

OTHER PUBLICATIONS

Russian Federation Federal Service for Intellectual Property, Patents and Trademarks Application Serial No. 2012110043/07, Office Action dated Aug. 6, 2013, 9 pages.

J. Moon et al., "Practical MIMO Architecture Enabling Very High Data Rates", IEEE 802.11-03/0999r0, Jan. 2004.

"Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment <number>: Enhancements for Higher Throughput", IEEE P802.11nTM/D2.00, Feb. 2007.

H. Minn et al., "Optimal Training Signals for MIMO OFDM Channel Estimation", IEEE Transactions on Wireless Communications, vol. 5, No. 5, May 2006.

F. Horlin et al., "Optimal training sequences for low complexity ML multi-channel estimation in multi-user MIMO OFDM-based communications", IEEE Communications Society, 2004.

"Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 5: Enhancements for Higher Throughput", IEEE P802.11n/D9.0, XP002606795, Mar. 2009.

Kurve, "Multi-user MIMO Systems: The Future in the Making", IEEE Potentials, XP011279304, Nov. 2009.

Samingan, et al., "LTF-Based vs. Pilot-Based MIMO-OFDM Channel Estimation Algorithms: An Experimental Study in 5.2 GHz Wireless Channel", IEEE 9th Malaysia International Conference on Communications, XP031648489, Dec. 2009.

Kartsakli, et al., "Multiuser MAC Protocols for 802.11n Wireless Networks", IEEE International Conference, XP031506185, Jun. 2009.

IEEE, "Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Higher Throughput," IEEE P802.11n/D11.0, Jun. 2009, 560 pages.

IP Australia Application Serial No. 2010328805, Search Report dated Jul. 10, 2013, 3 pages.

Japan Patent Office Application Serial No. 2012-538776, Office Action dated Sep. 20, 2013, 3 pages.

IEEE, "Part 11: Wireless LAN Medium Access Control (MAC) and Physical Layer (PHY) Specifications," IEEE 802.11n, IEEE Standard for Information technology—Telecommunications and Information exchange between systems—Local and Metropolitan area networks—Specific Requirements, Oct. 2009, 11 pages.

Huawei, "DL MIMO Codebook for 8 antenna ports," 3GPP TSG-RAN3 WG1#57, R1-091819, May 2009, 8 pages.

Korean Intellectual Property Office Application Serial No. 10-2012-7004921, Notice of Allowance dated Nov. 26, 2013, 2 pages.

802.11 Working Group of the 802 Committee, "Part 11: Wireless LAN Medium Access Control (MAC) and Physical Layer (PHY) specifications, Amendment 5: Enhancements for Higher Throughput," Draft Standard for Information Technology—Telecommunications and information exchange between systems—Local and metropolitan area networks—Specific requirements, IEEE P802.11n/D9.0, Mar. 2009, 586 pages.

The State Intellectual Property Office of the People's Republic of China Application Serial No. 201080041157.9, Office Action dated Feb. 26, 2014, 6 pages.

3rd Generation Partnership Project 2 (3GPP2), "Physical Layer for Ultra Mobile Broadband (UMB) Air Interface Specification," 3GPP2 C.S0084-001-0, Version 2.0, XP-002517486, Aug. 2007, 28 pages.

Evangelaras, et al., "Applications of Hadamard matrices," XP-002375500, 2003, 8 pages.

European Patent Office Application Serial No. 10836195.7, Final Office Action dated Jun. 27, 2014, 9 pages.

* cited by examiner

FIG. 9

$$P_{VHT\text{-}LTF(8Tx)} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

with boxes indicating 5 layers, 6 layers, 7 layers, and 8 layers.

FIG. 10

$$P_{VHT\text{-}LTF(8Tx)} \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

with nested groupings labeled 5 layers, 6 layers, 7 layers, 8 layers.

METHOD AND APPARATUS OF TRANSMITTING TRAINING SIGNAL IN WIRELESS LOCAL AREA NETWORK SYSTEM

CROSS-REFERENCE TO RELATED APPLICATIONS

Pursuant to 35 U.S.C. §119(e), this application claims the benefit of priority from U.S. Provisional Application No. 61/285,524, filed on Dec. 10, 2009, the contents of which is hereby incorporated by reference herein in its entirety.

BACKGROUND OF THE INVENTION

1. Field of the Invention

The present invention relates to wireless communication, and more particularly, to a method and apparatus for transmitting a training signal in a Wireless Local Area Network (WLAN) system.

2. Related Art

With the recent development of information communication technology, a variety of wireless communication techniques are being developed. From among them, a WLAN is a technique which enables wireless access to the Internet at homes or companies or in specific service providing areas through mobile terminals, such as a Personal Digital Assistant (PDA), a laptop computer, and a Portable Multimedia Player (PMP), on the basis of radio frequency technology.

Since Institute of Electrical and Electronics Engineers (IEEE) 802 (i.e., the standard organization of WLAN technology) was set up on February, 1980, lots of standardization tasks are being performed.

The initial WLAN technology was able to support the bit rate of 1 to 2 Mbps through frequency hopping, band spreading, and infrared communication by using a 2.4 GHz frequency band in accordance with IEEE 802.11, but the recent WLAN technology can support a maximum bit rate of 54 Mbps by using Orthogonal Frequency Division Multiplex (OFDM). In addition, in the IEEE 802.11, the standardization of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, is put to practical use or being developed.

Furthermore, as a recent technology standard for overcoming limits to the communication speed considered as vulnerabilities in the WLAN, there is IEEE 802.11n which has recently been standardized. The object of the IEEE 802.11n is to increase the speed and reliability of a network and to expand the coverage of a wireless network. More particularly, the IEEE 802.11n is based on a Multiple Inputs and Multiple Outputs (MIMO) technique using multiple antennas on both sides of a transmitter and a receiver in order to support a High Throughput (HT) having a data processing speed of 540 Mbps or higher, minimize transmission errors, and optimize the data rate. Furthermore, the IEEE 802.11n may use not only a coding method of transmitting several redundant copies in order to increase data reliability, but also an Orthogonal Frequency Division Multiplex (OFDM) method in order to increase the data rate.

With the spread of the WLAN being activated and applications using the WLAN becoming diverse, there is a need for a new WLAN system for supporting a higher throughput than the data processing speed supported by the IEEE 802.11n standard. A Very High Throughput (VHT) WLAN system is one of IEEE 802.11 WLAN systems recently proposed in order to support the data processing speed of 1 Gpbs, or higher. The term 'VHT WLAN system' is arbitrary, and a feasibility test for MIMO and a system using a channel bandwidth of 80 MHz or higher is in progress in order to provide the throughput of 1 Gpbs or higher.

In order to handle an increase of the number of spatial streams that can be used to send data and to support MIMO transmission for multiple users, a method of generating and sending a training signal for the channel estimation of spatial streams between a transmission station and a reception station needs to be taken into consideration.

SUMMARY OF THE INVENTION

An object of the present invention is to provide a method of generating and sending a training signal in a WLAN system and an apparatus supporting the method.

In an aspect of the present invention, there is provided a method of transmitting a training signal in a Wireless Local Area Network (WLAN) system, including generating one or more first training signals for a first destination station and one or more second training signals for a second destination station by applying a mapping matrix P to a training signal generation sequence; mapping the first training signals and the second training signals to a plurality of antennas according to an antenna mapping matrix; and performing Inverse Fast Fourier Transform (IFFT) on each of the first training signals and the second training signals mapped to the plurality of antennas and sending the training signals through the plurality of antennas.

The mapping matrix P may be determined by Equation below.

$$P = \begin{bmatrix} P_{4\times4} & P_{4\times4} \\ P_{4\times4} & -P_{4\times4} \end{bmatrix}$$

where $P_{4\times4}$ is a 4×4 orthogonal matrix.
The $P_{4\times4}$ may be equal to Equation below.

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

The first training signals may be used for the first destination station to demodulate data of the first destination station, transmitted after the first training signals are transmitted, or to estimate a channel between the first destination station and a transmission station transmitting the first training signals. The second training signals may be used for the second destination station to demodulate data of the second destination station, transmitted after the second training signals are transmitted, or to estimate a channel between the second destination station and the transmission station.

In another aspect of the present invention, there is provided a method of transmitting a training signal in a WLAN system, including generating a plurality of training signals by applying a mapping matrix $P_k$ to a training signal generation sequence and transmitting the plurality of training signals to one or more destination stations.

The mapping matrix $P_k$ may be determined by Equation below.

$$P_k = \begin{bmatrix} P_{k-1} & P_{k-1} \\ P_{k-1} & -P_{k-1} \end{bmatrix}$$

wherein k is a natural number, and $P_0$ is a 4×4 orthogonal matrix.

The 4×4 orthogonal matrix $P_0$ may be equal to Equation below.

$$P_0 = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

The number of training signals may be equal to or larger than the number of spatial streams used to transmit data when the data is transmitted to the one or more destination stations after the training signals are transmitted.

The training signal may be used for the destination station to demodulate data transmitted after the training signal is transmitted or to estimate a channel between the destination station and a transmission station transmitting the training signal.

Transmitting the plurality of training signals to the one or more destination stations may include mapping the plurality of training signals to a plurality of antennas according to an antenna mapping matrix and performing IFFT on each of the plurality of training signals mapped to the plurality of antennas and sending the training signals through the plurality of antennas.

The training signal generation sequence may be a predetermined value and selected according to a bandwidth of a channel used.

In yet another aspect of the present invention, there is provided a method of transmitting a training signal in a WLAN system, including generating a first training signal for a first destination station by applying a first mapping matrix to a training signal generation sequence; generating a second training signal for a second destination station by applying a second mapping matrix to the training signal generation sequence; and sending the first training signal and the second training signal to a plurality of destination stations, comprising the first destination station and the second destination station, by using Multi-User Multiple Input Multiple Output (MU-MIMO) technology.

In further yet another aspect of the present invention, there is provided a radio apparatus, including a training signal transmission unit transmitting a training signal and a training signal generation unit generating the training signal. The training signal generation unit generates one or more first training signals for a first destination station and one or more second training signals for a second destination station by applying a mapping matrix P to a training signal generation sequence. transmitting the first training signals and the second training signals to the first destination station and the second destination station is configured to map the first training signals and the second training signals to a plurality of antennas based on an antenna mapping matrix and to perform IFFT on each of the first training signals and the second training signals mapped to the plurality of antennas and transmit the first training signals and the second training signals through the plurality of antennas.

The mapping matrix P may be determined by Equation below.

$$P = \begin{bmatrix} P_{4\times 4} & P_{4\times 4} \\ P_{4\times 4} & -P_{4\times 4} \end{bmatrix}$$

wherein $P_{4\times 4}$ is a 4×4 orthogonal matrix.

The $P_{4\times 4}$ may be equal to Equation below.

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

BRIEF DESCRIPTION OF THE DRAWINGS

FIG. 9 shows an 8×8 VHT-LTF orthogonal mapping matrix and a method of using the same according to an embodiment of the present invention;

FIG. 10 shows an 8×8 VHT-LTF orthogonal mapping matrix and a method of using the same according to another embodiment of the present invention;

DESCRIPTION OF EXEMPLARY EMBODIMENTS

Some embodiments of the present invention are described in detail below with reference to the accompanying drawings.

Figure 1:
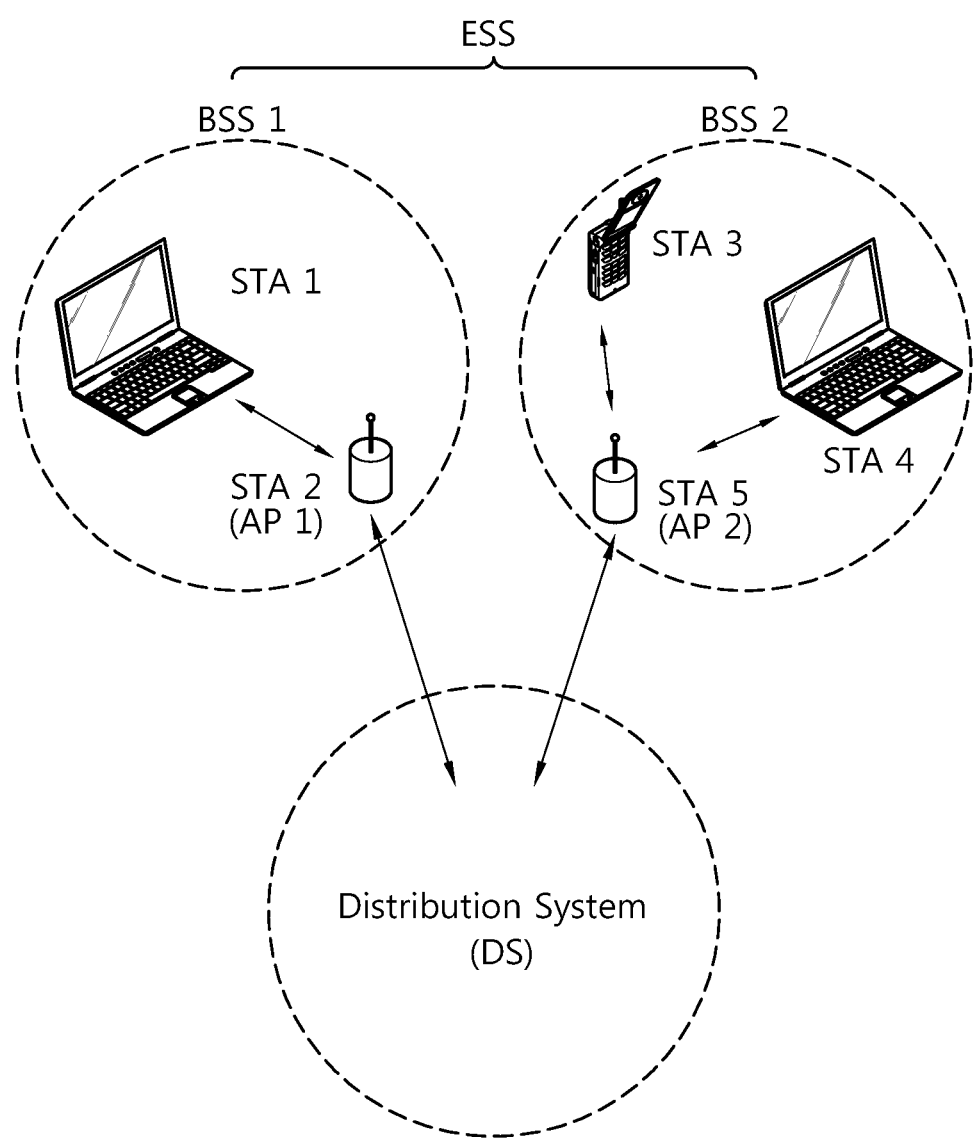
FIG. 1 is a diagram showing an example of a WLAN system to which an embodiment of the present invention can be applied.

FIG. 1 is a diagram showing an example of a WLAN system to which an embodiment of the present invention can be applied.

Referring to FIG. 1, the WLAN system includes one or more Basic Service Sets (hereinafter referred to as a 'BSS'). The BSS is a set of stations (hereinafter referred to as a 'STA') which can communicate with each other through successful synchronization. The BSS is not a concept indicating a specific area. Furthermore, as in a WLAN system to which an embodiment of the present invention can be applied, a BSS supporting ultra-high data processing of 1 GHz or higher at the MAC Service Access Point (SAP) is referred to as a VHT BSS.

The VHT BSS can be classified into an infrastructure BSS and an Independent BSS (hereinafter referred to as an 'IBSS'). An infrastructure BSS is shown in FIG. 1. The infrastructure BSS BSS1 and BSS2 includes one or more Non-AP STAs STA 1, STA 3, and STA 4, Access Points AP 1 (STA 2) and AP 2 (STA 5) providing distribution service, and a Distribution System (hereinafter referred to as a 'DS') interconnecting the plurality of APs AP 1 and AP 2. In the infrastructure BSS, an AP STA manages the Non-AP STAs of the BSS.

On the other hand, the IBSS (i.e., the independent BSS) is a BSS operating in the ad-hoc mode. The IBSS does not include a centralized management entity, performing a management function at the center, because it does not include an AP VHT STA. That is, in the IBSS, Non-AP STAs are managed in a distributed manner. Furthermore, in the IBSS, all STAs can be composed of mobile STAs, and they form a self-contained network because access to a DS is not permitted.

An STA is certain function media, including a Medium Access Control (MAC) layer and a physical layer interface for a radio medium in accordance with the IEEE 802.11 standard, and it broadly includes both an AP and a Non-AP STA. Furthermore, an STA, supporting MU-MIMO transmission to be described later and ultra-high data processing of 1 GHz or higher, is referred to as a VHT STA. In a VHT WLAN system to which the embodiment of the present invention can be applied, all STAs included in the BSS may be VHT STAs or may be VHT STAs and non-VHT STAs (e.g., STAs supporting the IEEE 802.11a/b/g/n standards) which coexist.

An STA for wireless communication includes a processor and a transceiver and further includes a user interface, display means, etc. The processor is a function unit configured to generate a frame which will be transmitted over a wireless network or to process a frame received over the wireless network. The processor performs various functions for controlling the STA. Furthermore, the transceiver is functionally connected to the processor and configured to transmit and receive a frame over the wireless network for the STA.

Portable terminal used by users, from among STAs, correspond to Non-AP STAs (e.g., STA1, STA3, and STA4). An STA may be simply referred as a Non-AP STA. The Non-AP STA may also be referred to as another terminology, such as a terminal, a Wireless Transmit/Receive Unit (WTRU), a User Equipment (UE), a Mobile Station (MS), a mobile terminal, or a mobile subscriber unit. Furthermore, a Non-AP STA, supporting ultra-high data processing on the basis of MU-MIMO technology to be described later, is referred to as a Non-AP VHT STA or simply a VHT STA.

Furthermore, the APs AP1 and AP2 are function entities providing access to the DS via a radio medium for STAs (i.e., association STAs) associated therewith. In an infrastructure BSS including an AP, communication between Non-AP STAs is performed via the AP in principle. In case where a direct link is set up, communication can be directly performed between Non-AP STAs. The AP may also be referred to as a concentrated controller, a Base Station (BS), a node-B, a Base Transceiver System (BTS), or a site controller. Furthermore, an AP, supporting ultra-high data processing on the basis of MU-MIMO technology to be described later, is referred to as a VHT AP.

A plurality of infrastructure BSSs can be interconnected through a DS (Distribution System). The plurality of BSSs interconnected through the DS is called an Extended Service Set (ESS). STAs included in the ESS can communicate with each other. Non-AP STAs can continue to communicate with each other within the same ESS and move from one BSS to another BSS.

A DS is a mechanism for enabling one AP to communicate with the other AP. According to the mechanism, an AP may send a frame to STAs which are managed by the AP and connected to a BSS, transfer a frame to any one STA in case where the STA has moved to another BSS, or transfer a frame over an external network, such as a wired network. The DS needs not to be necessarily a network, and it may have any type as long as it can provide predetermined distribution service regulated in the IEEE 802.11 standard. For example, the DS may be a wireless network, such as a mesh network, or a physical structure for interconnecting APs.

In a VHT WLAN system, several STAs use the MU-MIMO technology in order to efficiently use a radio channel at the same time. In other words, several STAs are permitted to send and receive data to and from an AP at the same time. An AP may send spatially multiplexed radio frames to several STAs at the same time. To this end, the AP may measure a channel condition, perform beamforming, and send and receive data using a plurality of spatial stream.

Hereinafter, to spatially multiplex data and send the spatially multiplexed data to a plurality of STAs is referred to as MU-MIMO transmission or SDMA transmission. In MU-MIMO transmission, at least one spatial stream is assigned to each STA which is a transmission target, and data can be sent to the STA using the assigned spatial stream.

Hereinafter, an STA supporting the IEEE 802.11a/b/g standards is referred to as a legacy STA and an STA supporting the IEEE 802.11n standard is referred to as an HT STA, in order to distinguish a VHT STA from the legacy STA and the HT STA. Likewise, a WLAN system supporting the IEEE 802.11a/b/g standard is referred to as a legacy system and a WLAN system supporting the IEEE 802.11n standard is referred to as an HT system, in order to distinguish a VHT system from the legacy system and the HT system. The functions of fields, assigned the same name in a PLCP frame format described herein, are the same in the entire range of this specification, unless otherwise described.

A PLCP frame is generated in the PLCP sublayer of an STA and transmitted to a destination STA via a PMD sublayer by using multiple antennas. Hereinafter, a PLCP frame format and a method of sending fields constituting the PLCP frame format are only illustrative, and the sequence in which the fields are transmitted is not limited to that shown in the drawings. In the following description, the sequence in which the fields are transmitted may be changed, unless the sequence is specially described otherwise, and some of the fields may be omitted or additional fields may be added.

Figure 2:
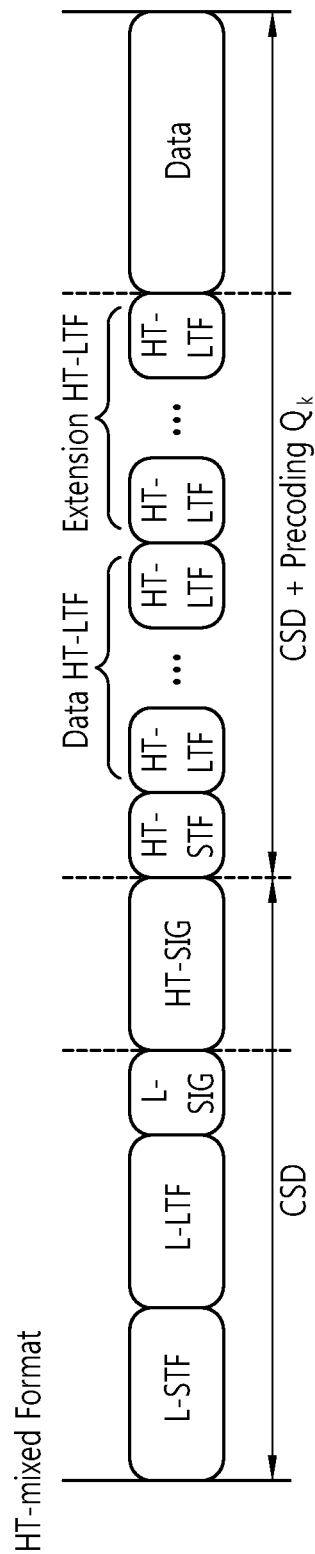
FIG. 2 is a block diagram showing an HT-mixed mode PLCP format of an HT system.

FIG. 2 is a block diagram showing an HT-mixed mode PLCP format of an HT system.

For detailed information about the HT-mixed mode PLCP format of an HT system, reference may be made to Paragraph 20.3 of IEEE 802.11n/D11.0 "Part 11: Wireless LAN Medium Access Control (MAC) and Physical Layer (PHY) specifications; Amendment 5: Enhancements for Higher Throughput" disclosed on June, 2009.

A PLCP frame is used to send a PLCP Protocol Data Unit (PPDU). The HT-mixed mode PLCP format of FIG. 2 is a PLCP format for guaranteeing the coexistence of an HT STA and a legacy STA in the HT system. To this end, the HT-mixed mode PLCP format includes a series of fields (e.g., L-STF, L-LTF, and L-SIG) for a legacy STA (so that the legacy STA can also recognize the fields).

Elements included in the HT-mixed mode PLCP frame are listed in Table 1 below.

TABLE 1

| Element | Description |
| --- | --- |
| L-STF (Non-HT Short Training Field) | Used for frame timing acquisition and Automatic Gain Control (AGC) convergence |
| L-LTF (Non-HT Long Training Field) | Used for channel estimation |
| L-SIG (Non-HT SIGNAL Field) | Including information for demodulating and decoding data for L-STA |
| HT-SIG (HT SIGNAL field) | Including information that an HT-STA demodulates and decodes data |
| HT-STF (HT Short Training Field) | Used for frame timing acquisition and AGC convergence |
| HT-GF-STF (HT-Green Field Short Training Field) | Used for frame timing acquisition and AGC convergence (only an HT STA can read HT-GF-STF) |
| HT-LTF1 (First HT Long Training Field) | Used for channel estimation |
| HT-LTF (HT Long Training Field) | Including data HT-LTF, used for channel estimation for data demodulation for HT-STA, and extension HT-LTF used for channel sounding |
| Data Field | Including PHY Service Data Unit (PSDU) |

STFs (Short Training Fields), such as L-STF, HT-STF, and HT-GF-STF, are used for frame timing acquisition, Automatic Gain Control (AGC), and so on and thus also referred to as a sync signal or a sync channel. That is, the STF is used for synchronization between STAs or between an STA and an AP.

Long Training Fields (LTFs), such as L-LTF and HT-LTF, are used for channel estimation for the demodulation of data or control information or both and thus also referred to as a reference signal, a training signal, or a pilot.

Fields, such as L-SIG and HT-SIG, are used to provide pieces of information necessary to decode data and thus also referred to as control information.

In the HT-mixed mode PLCP format of an HT system, a Legacy Short Training Field (L-STF), a Legacy Long Training Field (L-LTF), and a Legacy Signal (L-SIG) are first transmitted. Accordingly, a legacy STA can read the PLCP format. An HT STA can know that a corresponding PLCP format is for an HT STA by acquiring control information from an HT-SIG field received after an L-SIG field.

In the HT system, Single-User MIMO (SU-MIMO) transmission is possible. An L-STF, an L-LTF, an L-SIG, and an HT-SIG are transmitted omni-directionally according to a non-MIMO transmission scheme, and an HT-STF and data are transmitted according to a SU-MIMO transmission scheme.

An HT-SIG includes information for interpreting an HT packet format following the HT-SIG. The HT-SIG consists of a total of 24 bits and includes the following information.

Modulation and Coding Scheme: 7 bits
Channel bandwidth 20/40 MHz: 1 bit
HT length: 16 bits
Smoothing: 1 bit
Not sounding: 1 bit
Reserved: 1 bit
Aggregation: 1 bit
STBC: 2 bits
FEC coding: 1 bit
Short GI: 1 bit
Number of Extension Spatial Streams: 2 bits
CRC: 8 bits
Tail bits: 6 bits As can be seen from Number of Extension Spatial Streams which is one of the fields constituting the HT-SIG, an HT STA supports SU-MIMO using a maximum of four spatial streams. Accordingly, there is a need for a new LTF for the channel estimation of multi spatial streams because channel estimation for each stream cannot be performed using a legacy LTF.

An HT system defines an HT-LTF for MIMO channel estimation. An HT-LTF is used for channel estimation like an LTF described above, but differs from an L-LTF in that the HT-LTF is designed to estimate an MIMO channel.

Figure 3:
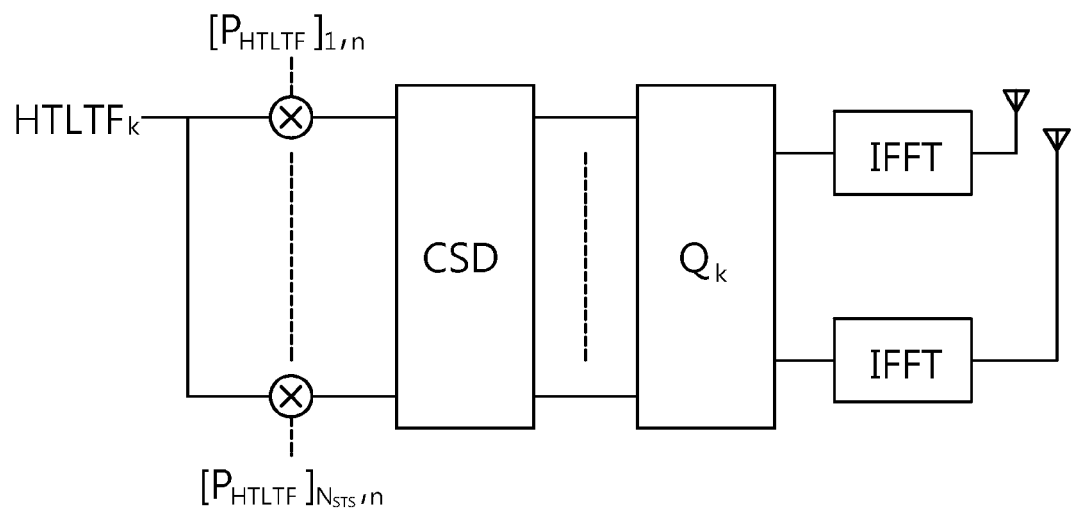
FIG. 3 schematically shows an example of a process of generating an LTF.

FIG. 3 is a diagram schematically showing an example of a process of generating an LTF. In FIG. 3, the process of generating an HT-LTF is described as an example. However, the above process may be applied to the generation of a VHT-LTF of the present invention.

An HTLTF sequence (HTLTFk) is multiplied by an HT-LTF mapping matrix PHTLTF. The HT-LTF mapping matrix PHTLTF is an orthogonal mapping matrix multiplied to the HTLTF sequence such that an HT-LTF can use it to estimate a channel for an MIMO channel. The HT-LTF mapping matrix PHTLTF may be defined by Equation 1 below.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad [\text{Equation 1}]$$

Next, a Cyclic Shift Delay (CSD) process for preventing unwanted beamforming is performed, and the HTLTF sequence is mapped to a Transmit (Tx) antenna by means of an antenna map matrix Qk for a k subcarrier. The antenna map matrix Qk functions to map a space time stream and a transmit chain. The HTLTF sequence mapped to the transmit chain is subjected to Inverse Fast Fourier Transform (IFFT) and then transmitted through the Tx antenna.

The HTLTF sequence may be an example of a training signal generation sequence according to the present invention. The training signal generation sequence according to the present invention may be referred to as a VHTLTF sequence, but an arbitrary name. A different training signal generation sequence may be used according to a channel bandwidth used by a VHT WLAN system. In other words, a different training signal generation sequence may be used according to a channel bandwidth of 20 MHz, 40 MHz, 80 MHz, or 160 MHz. The training signal generation sequence is already known to an STA, transmitting a training signal, and an STA receiving the training signal. The receiving STA can estimate a channel and demodulate data using a training signal with reference to a training signal generation sequence which is used according to a bandwidth of the channel.

Figure 4:
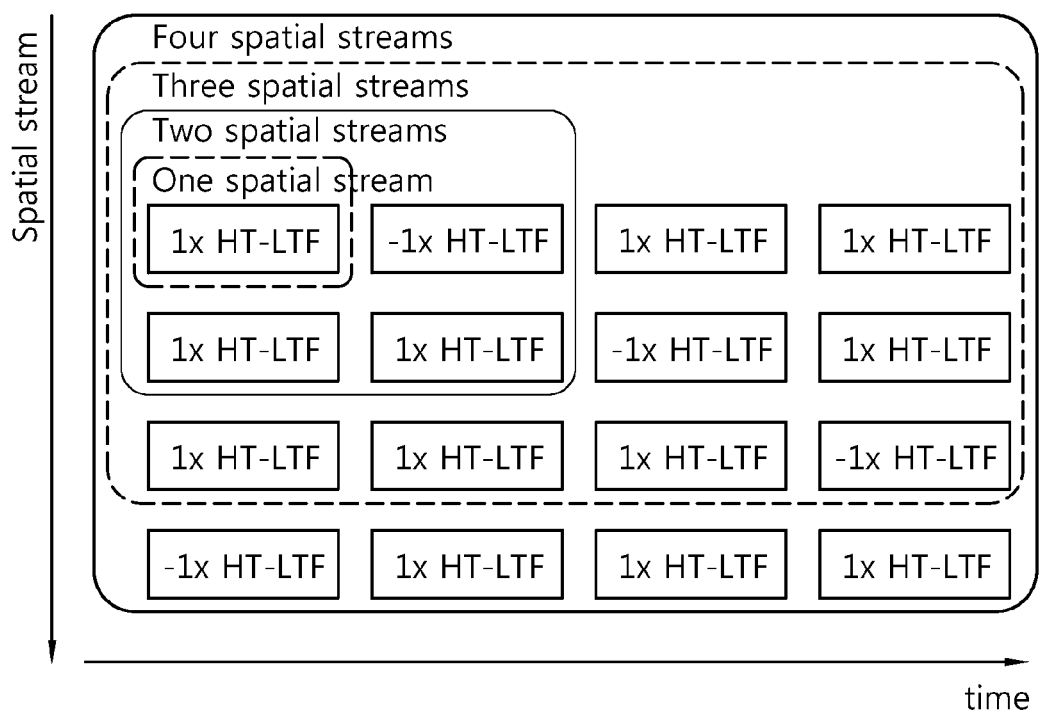
FIG. 4 shows an example of an HT-LTF mapping matrix PHTLTF according to the number of spatial streams.

FIG. 4 shows an example of an HT-LTF mapping matrix PHTLTF according to the number of spatial streams.

As can be seen from the example of FIG. 4, a training symbol is defined per spatial stream and transmitted in order to estimate the channel of each spatial stream. When the number of spatial streams is 1, 2, or 4, 1, 2, or 4 HT-LTFs are transmitted. However, when the number of spatial streams is 3, one extra long training symbol is added, and four HT-LTFs are used.

In order to describe a method of estimating the channel of an HT-STA by using an orthogonal mapping matrix, it is assumed that in an HT system, a transmitting STA sends a training symbol to a receiving STA through 2 layers. Here, the training symbol received by the receiving STA may be represented by Equation 2 below.

$$\begin{bmatrix} r_1(t) \\ r_2(t) \end{bmatrix} = \begin{bmatrix} h_{11} & h_{12} \\ h_{21} & h_{22} \end{bmatrix} \begin{bmatrix} P_1(t) \\ P_2(t) \end{bmatrix} + \begin{bmatrix} n_1(t) \\ n_2(t) \end{bmatrix} \begin{pmatrix} P_1(t_1) = HTLTF \\ P_1(t_2) = -HTLTF \\ P_2(t_1) = HTLTF \\ P_2(t_2) = HTLTF \end{pmatrix} \quad \text{[Equation 2]}$$

where hnm indicates a channel between the nth antenna of a sender and the mth antenna of a receiver, Pn(t) indicates a training symbol transmitted through the nth antenna of the sender, and nm(t) indicates Additive White Gaussian Noise (AWGN) experienced by the mth antenna of the receiver. Equation 2 may be represented into Equation 3 below by substituting a training symbol into Equation 2.

$$\begin{bmatrix} r_1(t_1) \\ r_2(t_1) \\ r_1(t_2) \\ r_2(t_2) \end{bmatrix} = \begin{bmatrix} h_{11} \times HTLTF + h_{12} \times HTLTF + n_1(t_1) \\ h_{21} \times HTLTF + h_{22} \times HTLTF + n_2(t_2) \\ -h_{11} \times HTLTF + h_{12} \times HTLTF + n_1(t_2) \\ -h_{21} \times HTLTF + h_{22} \times HTLTF + n_2(t_2) \end{bmatrix} \quad \text{[Equation 3]}$$

If the channel hnm is found for all n and m in Equation 3, it results in Equation 4 below.

$$h_{11} = \frac{r_1(t_1) - r_1(t_2)}{2 \times HTLTF} \quad \text{[Equation 4]}$$

$$h_{12} = \frac{r_1(t_1) + r_1(t_2)}{2 \times HTLTF}$$

$$h_{21} = \frac{r_2(t_1) - r_2(t_2)}{2 \times HTLTF}$$

$$h_{22} = \frac{r_2(t_1) + r_2(t_2)}{2 \times HTLTF}$$

When the number of layers is 3 or 4, the channel hnm can be found through the process of Equation 2 to Equation 4.

Hereinafter, assuming that four Tx antennas and one Rx antenna exist, a channel information Signal power-to-Noise power Ratio (SNR) when a channel is estimated is found.

Here, a signal received by the Rx antenna may be represented by Equation 5.

$$r(t_0) = +h_0 P + h_1 P + h_2 P - h_3 P + n(t_0) \quad \text{[Equation 5]}$$
$$r(t_1) = -h_0 P + h_1 P + h_2 P + h_3 P + n(t_1)$$
$$r(t_2) = +h_0 P - h_1 P + h_2 P + h_3 P + n(t_2)$$
$$r(t_3) = +h_0 P + h_1 P - h_2 P + h_3 P + n(t_3)$$

A result of the channel estimation obtained by Equation 5 may be represented by Equation 6 below.

$$h'_0 = \frac{r(t_0) - r(t_1) + r(t_2) + r(t_3)}{4 \times P} \quad \text{[Equation 6]}$$
$$= h_0 + \frac{n(t_0) - n(t_1) + n(t_2) + n(t_3)}{4 \times P}$$

In Equation 6, the second term on the right side indicates noise included in the received signal. From Equation 6, the SNR of a signal received by a receiving terminal can be found as in Equation 7 below.

$$\frac{S}{N} = \frac{E[|h_0|^2]}{E\left[\left|\frac{n(t_0) - n(t_1) + n(t_2) + n(t_3)}{4 \times P}\right|^2\right]} \quad \text{[Equation 7]}$$

$$= \frac{|h_0|^2}{\frac{1}{16} \times \frac{E[|n(t_0) - n(t_1) + n(t_2) + n(t_3)|^2]}{E[|P|^2]}}$$

$$= \frac{16 \times E[|P|^2] \times |h_0|^2}{E[|n(t_0) - n(t_1) + n(t_2) + n(t_3)|^2]}$$

$$= \frac{16 \times E[|P|^2] \times |h_0|^2}{4 \times \sigma^2}$$

$$= 4 \times \frac{|h_0|^2}{\sigma^2}$$

In Equation 7, σ2 is a noise power spectrum density. As can be seen from the expansion of the equation, a channel estimation gain of about 6 dB can be obtained from four times of LTF transmission.

A VHT WLAN system supports MU-MIMO in addition to SU-MIMO. It is expected that a VHT system will support MIMO transmission of a minimum of 8 spatial streams. An example of a PLCP frame format which may be used in a VHT system supporting MU-MIMO transmission using 8 or more spatial streams is shown in FIG. 5.

Figure 5:
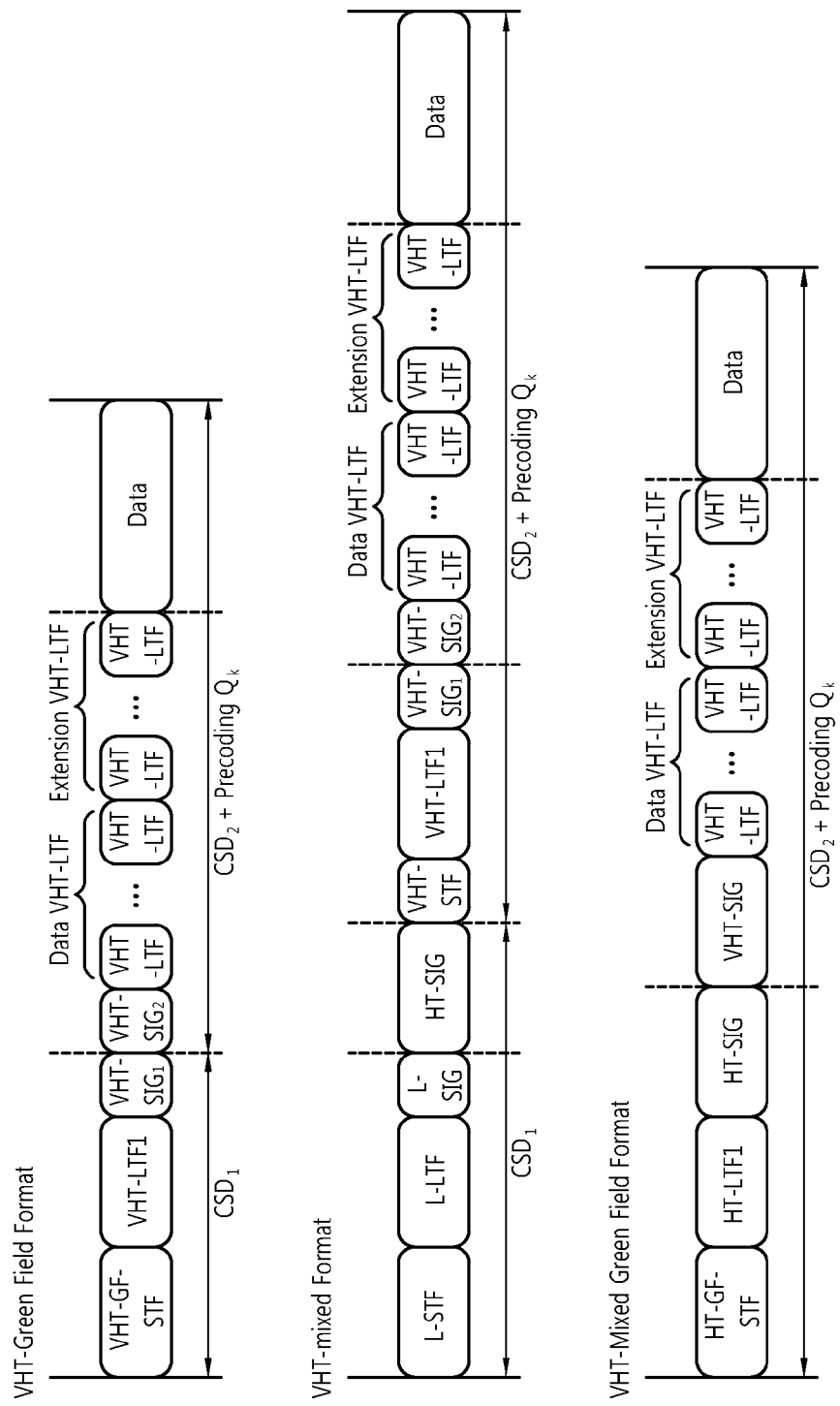
FIG. 5 shows an example of a PLCP frame format which may be used in a VHT system supporting MU-MIMO transmission using 8 or more spatial streams.

In FIG. 5, a VHT-Green Field Format is an example of a PLCP frame format which may be used in a system consisting of only VHT STAB. A VHT-Mixed Format is an example of a PLCP frame format which may be used in a system in which a legacy STA, an HT STA, and a VHT STA coexist. A VHT-Mixed Green Field Format is an example of a PLCP frame format which may be used in a system consisting of only an HT STA and a VHT STA. The names of fields constituting the PLCP frame format and the PLCP frame format shown in FIG. 5, the sequence in which the fields are transmitted, and a method of sending the fields are arbitrary. Hereinafter, the sequence and the method, unless specially described otherwise, are not limited to that shown in FIG. 5.

The VHT-Mixed Format is different from the VHT-Green Field Format in that it further includes fields (e.g., an L-STF, an L-LTF, an L-SIG field, and an HT-SIG field) for a legacy STA and an HT STA existing in a system. Here, the fields (e.g., an L-STF, an L-LTF, an L-SIG field, and an HT-SIG field) for a legacy STA and an HT STA are transmitted without beamforming. Fields from a VHT-STF may be precoded, subjected to beamforming, and then transmitted.

The VHT-Mixed Green Field Format may include an HT-GF-STF, an HT-LTF1, and an HT-SIG field for an HT STA.

In the PLCP frame format of FIG. 5, the VHT-STF and the VHT-LTF for a VHT STA may be precoded, subjected to beamforming, and then transmitted. A PLCP frame format which is used in a VHT system supporting MU-MIMO using 8 or more spatial streams requires more transmission of a VHT-LTF and an extension VHT-LTF, as compared with an HT system. The VHT-LTF is used to estimate a channel and demodulate data. The extension VHT-LTF is used to sound the extra spatial dimensions of an MIMO channel.

The present invention proposes a method of generating VHT-LTFs for transmitting 5 or more layers which may be used in a VHT system, an orthogonal mapping matrix used to generate the VHT-LTF, and a method of using the orthogonal mapping matrix.

Figure 6:
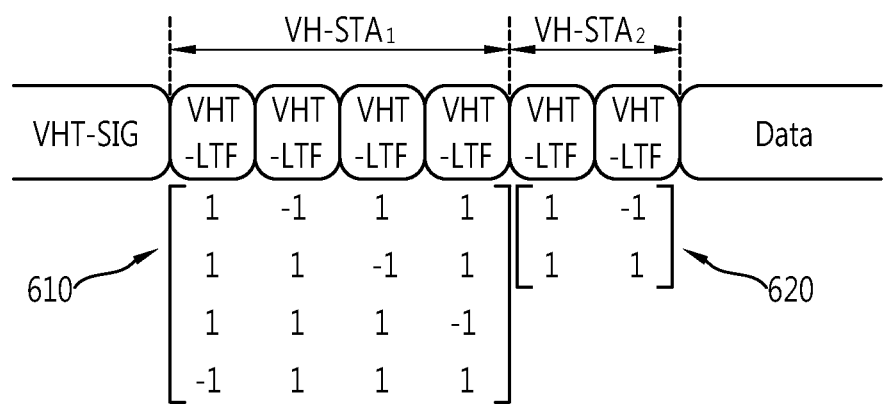
FIG. 6 shows a method of generating VHT-LTFs according to an embodiment of the present invention.

FIG. 6 shows the method of generating VHT-LTFs according to an embodiment of the present invention.

According to the embodiment of the present invention, the orthogonal mapping matrix applied to the VHT-LTF may be used on an STA basis. In FIG. 6, it is assumed that in a VHT system, a VHT-STA0 is sought to perform MU-MIMO transmission to a VHT-STA1 and a VHT-STA2. It is also assumed that the VHT-STA1 and the VHT-STA2 (i.e., destination STAs for MU-MIMO transmission) can perform reception through 4 layers and 2 layers, respectively.

The number of LTFs that should be received by the VHT-STA1 and the VHT-STA2 may be signaled to the VHT-STA1 and the VHT-STA2 through a VHT-SIG field transmitted prior to sending VHT-LTFs. When the transmitting STA VHT-STA0 sends a PLCP frame, the transmitting STA VHT-STA0 sends a total of 6 VHT-LTFs. The first 4 VHT-LTFs of the 6 VHT-LTFs may be received by the VHT-STA1 in order to estimate a channel. The remaining 2 VHT-LTFs of the 6 VHT-LTFs may be received by the VHT-STA2 in order to estimate a channel. An orthogonal mapping matrix 610 used to generate the VHT-LTFs for the VHT-STA1 and an orthogonal mapping matrix 620 used to generate the VHT-LTFs for the VHT-STA2 may be individually used.

For example, the HTLTF mapping matrix of an HT system in Equation 1 may be used as the orthogonal mapping matrix.

FIG. 6 shows an example in which a 4×4 HT-LTF orthogonal mapping matrix is used for the VHT-LTFs for the VHT-STA1 and a 2×2 HT-LTF orthogonal mapping matrix is used for the VHT-LTFs for the VHT-STA2.

Figure 7:
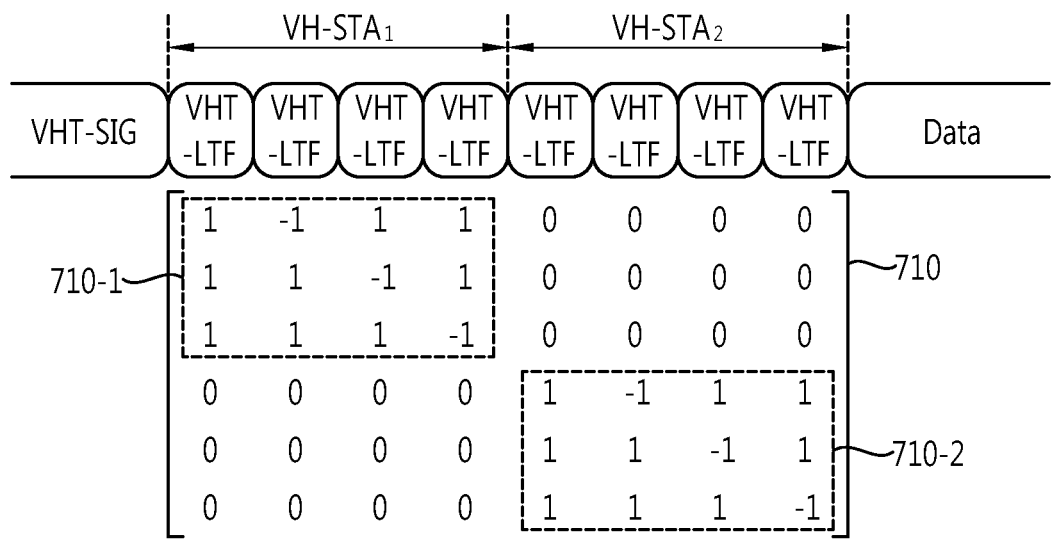
FIG. 7 shows a method of generating VHT-LTFs according to another embodiment of the present invention.

FIG. 7 shows an example of a method of generating VHT-LTFs according to another embodiment of the present invention.

In accordance with the method of generating VHT-LTFs according to the embodiment of the present invention, VHT-LTFs may be generated and transmitted using one VHT-LTF orthogonal mapping matrix irrespective of the number of destination STAs. In other words, the VHT-LTF orthogonal mapping matrix may be configured and used according to the number of a total of layers (i.e., a required number of VHT-LTFs).

In FIG. 7, it is assumed that a source STA VHT-STA0 sends data to each of a destination STA VHT-STA1 and a destination VHT-STA2 through 3 layers. Here, the number of VHT-LTFs that should be sent to each of the VHT-STA1 and the VHT-STA2 is 4, and a total of eight times of VHT-LTF transmission is required. The method of FIG. 6 in which the VHT-LTF orthogonal mapping matrix is applied to each of destination STAs also requires eight times of VHT-LTF transmission.

The VHT-LTF orthogonal mapping matrix used to generate the eight VHT-LTFs may be configured as in the matrix 710 of FIG. 7.

A 3×4 matrix 710-1 used to generate four VHT-LTFs sent to the VHT-STA1 and a 3×4 matrix 710-2 used to generate four VHT-LTFs sent to the VHT-STA2 can be obtained by using a 3×4 HT-LTF orthogonal mapping matrix. The remaining elements of the matrix 710 other than the 3×4 matrix 710-1 and the 3×4 matrix 710-2 consist of 0.

The above method of sending the eight VHT-LTFs in a condition that the eight VHT-LTFs are sent to the destination STAs through a total of 6 layers may cause throughput loss. In order to solve the above problem, according to another embodiment of the present invention, the VHT-LTF orthogonal mapping matrix may be used according to the number of a total of layers. That is, the VHT-LTF orthogonal mapping matrix may be used for one layer, two layers, or four layers.

This method can be used to prevent a reduction of transmission efficiency by reducing an unnecessary number of VHT-LTF transmissions.

Figure 8:
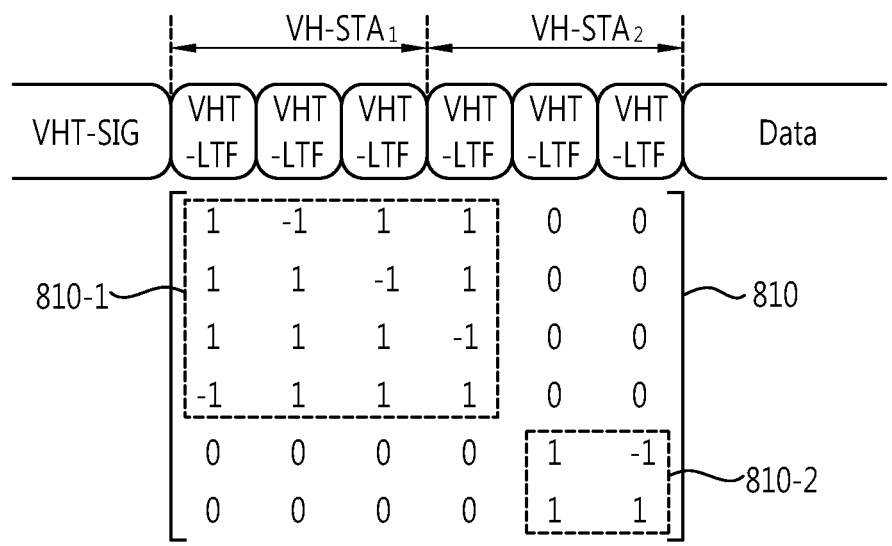
FIG. 8 shows a method of generating VHT-LTFs according to yet another embodiment of the present invention.

FIG. 8 shows a method of generating and sending VHT-LTFs according to yet another embodiment of the present invention.

In case where data is sought to be sent to each of a VHT-STA1 and a VHT-STA2 through 3 layers, a total of 6 VHT-LTFs have to be generated. Here, a VHT-LTF orthogonal mapping matrix may be configured according to one layer, two layers, or 4 layers without distinguishing destination STAs to which data will be sent through the total of 6 layers.

A VHT-LTF orthogonal mapping matrix 810 of FIG. 8 may have a 6×6 square matrix, including a 4×4 partial matrix 810-1 and a 2×2 partial matrix 810-2. The remaining elements of the VHT-LTF orthogonal mapping matrix 810 other than the 4×4 partial matrix 810-1 and the 2×2 partial matrix 810-2 consist of 0. Here, an HTLTF mapping matrix may be used as the 4×4 partial matrix 810-1, and a 2×2 HTLTF mapping matrix may be used as the 2×2 partial matrix 810-2.

The 8 VHT-LTFs are used to send data through the total of 6 layers in the method of FIG. 7. However, if the VHT-LTF orthogonal mapping matrix of FIG. 8 is used, 6 VHT-LTFs can be used to send data through the total of 6 layers. Accordingly, a reduction of system efficiency can be prevented because two VHT-LTFs for data transmission can be reduced.

Meanwhile, a conventional HT system is problematic in that it cannot be applied to a VHT system for supporting data transmission through at least 8 layers because it supports data transmission through a maximum of 4 layers. In other words, an 8×8 orthogonal mapping matrix that can be used in a VHT system for supporting data transmission through 5 or more layers must be taken into consideration.

The present invention proposes an 8×8 orthogonal mapping matrix PVHT-LTF(8Tx) for a VHT system.

An example of the 8×8 orthogonal mapping matrix PVHT-LTF(8Tx) for a VHT system, proposed by the present invention, can be obtained by using Equation 8 below.

$$H_{2^k} = \begin{bmatrix} H_{2^{k-1}} & H_{2^{k-1}} \\ H_{2^{k-1}} & -H_{2^{k-1}} \end{bmatrix} \text{ (where } H_{2^0} = [1]\text{)} \quad \text{[Equation 8]}$$

The 8×8 VHT-LTF orthogonal mapping matrix obtained according to Equation 8 and a method of using the same are shown in FIG. 9.

The 8×8 VHT-LTF orthogonal mapping matrix according to an embodiment of the present invention may be obtained and applied to transmission through 5, 6, 7, or 8 layers, as shown in FIG. 9. In the VHT-LTF orthogonal mapping matrix of FIG. 9, codes between the layers always maintain orthogonality. Accordingly, an STA receiving VHT-LTFs can easily obtain information about a channel to be estimated through calculation using + and − in the same manner as Equation 4. In the VHT-LTF orthogonal mapping matrix of FIG. 9, the sequence of column vectors may be randomly changed.

Another example of the 8×8 orthogonal mapping matrix PVHT-LTF(8Tx) for a VHT system, proposed by the present invention, can be obtained by using Equation 9 below.

$$H_{2^k} = \begin{bmatrix} H_{2^{k-1}} & H_{2^{k-1}} \\ H_{2^{k-1}} & -H_{2^{k-1}} \end{bmatrix} \quad \text{[Equation 9]}$$

The matrix generation method according to Equation 9 is basically the same as that of Equation 8. Here, $H_{2^{k-1}}$ of Equation 9 may become the LTF mapping matrix of an HT system. In other words, an 8×8 matrix, obtained by extending the HT LTF mapping matrix of Equation 1 according to Equation 9, can be used as the VHT-LTF orthogonal mapping matrix of the method of generating and sending VHT-LTFs, proposed by the present invention.

As described above, the 8×8 or 16×16 VHT-LTF orthogonal mapping matrix is obtained by using an HT system. The conventional transmission limit using a maximum of 4 layers can be overcome, and the VHT-LTF orthogonal mapping matrix that can be applied to a VHT system supporting 8 layers or more can be obtained. Furthermore, there is an advantage in terms of backward compatibility.

FIG. 10 shows the 8×8 VHT-LTF orthogonal mapping matrix described in connection with Equation 9 and a method of using the 8×8 VHT-LTF orthogonal mapping matrix for transmission through 5 to 8 layers according to another embodiment of the present invention.

For example, in case where transmission is performed through 5 layers, a partial matrix obtained by first to fifth row vectors may be used. In case where transmission is performed through 7 layers, a partial matrix obtained by first to seventh row vectors may be used. Here, the sequence of column vectors may be randomly changed.

Figure 11:
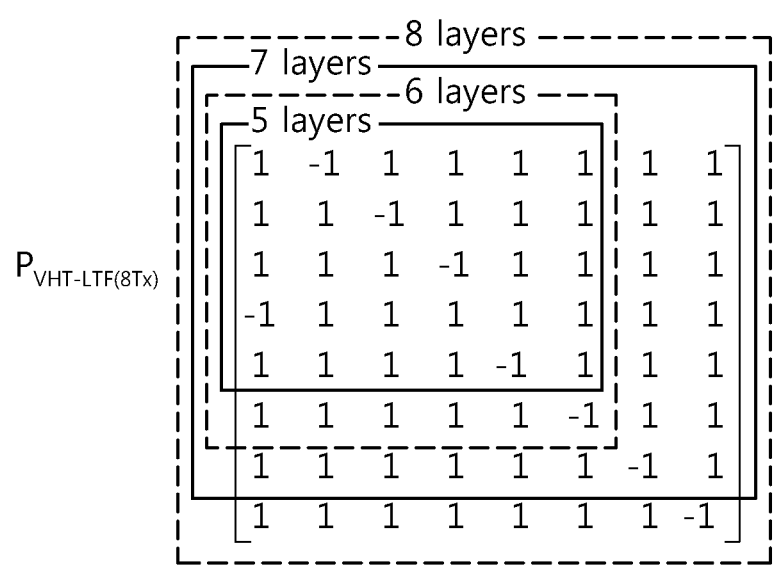
FIG. 11 shows an 8×8 VHT-LTF orthogonal mapping matrix and a method of using the same according to yet another embodiment of the present invention.

FIG. 11 shows the 8×8 VHT-LTF orthogonal mapping matrix described in connection with Equation 9 and a method of using the 8×8 VHT-LTF orthogonal mapping matrix for transmission through 5 to 8 layers according to yet another embodiment of the present invention.

If the method of generating and sending a training signal using the matrix of FIG. 11 is used, 1 to 4 layers may be used according to the existing HT system method, a 5×6 or 6×6 matrix set may be used in 5 or 6 layers, and a 7×8 or 8×8 matrix set may be used in 7 or 8 layers.

In the above method of generating and sending VHT-LTFs, in case where VHT-LTFs are sought to be transmitted through 5 or 6 layers, only 6 VHT-LTFs can be transmitted. Accordingly, there is an advantage in terms of transmission efficiency.

In the partial matrices used according to the number of layers in FIG. 11, the sequence of column vectors may be randomly changed.

Figure 12:
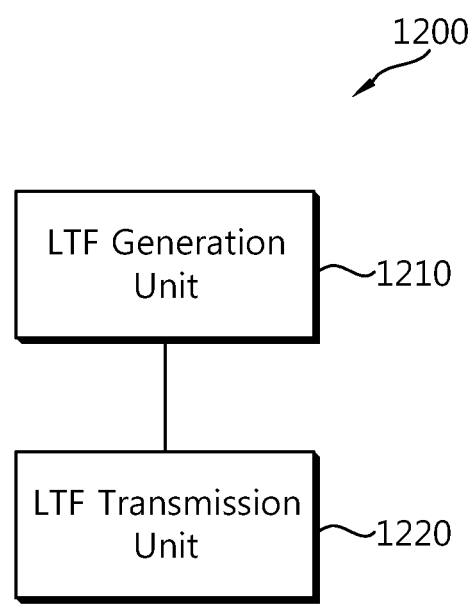
FIG. 12 is a block diagram of a radio apparatus in which embodiments of the present invention are implemented.

FIG. 12 is a block diagram showing a radio apparatus in which the embodiments of the present invention are implemented. The radio apparatus 1200 may be part of the non-AP STA or the AP of a WLAN system.

The radio apparatus 1200 includes an LTF generation unit 1210 and an LTF transmission unit 1220. The LTF generation unit 1210 generates a training signal by using the VHT-LTF orthogonal mapping matrix according to the above-described embodiments. The LTF transmission unit 1220 sends the generated training signal to one or more radio apparatuses. The generation and transmission of the training signal may be performed through multiple antennas by multiplying the training signal sequence VHTLTFk by the VHT-LTF orthogonal mapping matrix and then performing processes, such as Cyclic Shift Delay (CSD) for preventing unwanted beamforming, mapping between a space time stream and a transmit chain, and Inverse Fast Fourier Transform (IFFT). To this end, the LTF transmission unit 1220 may include multiple antennas. The LTF transmission unit 1220 may send part of or the entire training signal, generated by the LTF generation unit 1210, through a beamforming process through precoding and beamforming. Here, the beamforming process through precoding may be performed by the LTF generation unit 1210.

The LTF generation unit 1210 and the LTF transmission unit 1220 may be implemented in a single chip in the form of a processor. The above embodiments in which the training signal is generated and sent may be configured as a software module, stored in memory, and executed by a processor.

There is provided a mapping matrix which can be used in a method of generating and sending a training signal in a WLAN system. Accordingly, multi-user Multiple Input Multiple Output (MU-MIMO) using a plurality of spatial streams can be supported.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a training signal in a Wireless Local Area Network (WLAN) system, the method comprising:

generating, by a transmitting station, Very High Throughput-Long Training Field (VHT-LTF) symbols used for a plurality of target stations by applying a mapping matrix P to a VHT-LTF sequence when a total number of spatial streams for the plurality of target stations is set to seven (7) or eight (8), wherein a number of the VHT-LTF symbols is set to be the same as a number of columns of the mapping matrix P when the total number of spatial streams for the plurality of target stations is set to seven (7) or eight (8); and transmitting, by the transmitting station, the VHT-LTF symbols to the plurality of target stations, wherein the mapping matrix P is determined by:

$$P = \begin{bmatrix} P_{4\times 4} & P_{4\times 4} \\ P_{4\times 4} & -P_{4\times 4} \end{bmatrix},$$

and
wherein $P_{4\times 4}$ is determined by $$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

and
wherein the first seven rows of the mapping matrix P are applied when the total number of spatial streams for the plurality of target stations is set to seven (7).

2. The method of claim 1, wherein the plurality of VHT-LTF symbols are used to estimate a multiple input multiple output (MIMO) channel of the plurality of target stations.

3. The method of claim 1,
wherein the plurality of target stations include a first target station and a second target station, and
wherein a number of spatial streams for the first target station is different from a number of spatial streams for the second target station.

4. The method of claim 3, wherein VHT-LTF symbols for the first target station are directly followed by VHT-LTF symbols for the second target station.

5. A transmitter in a Wireless Local Area Network (WLAN), the transmitter comprising:
a generation unit configured to generate Very High Throughput-Long Training Field (VHT-LTF) symbols used for a plurality of target stations by applying a mapping matrix P to a VHT-LTF sequence when a total number of spatial streams for the plurality of target stations is set to seven (7) or eight (8), wherein a number of the VHT-LTF symbols is set to be the same as a number of columns of the mapping matrix P when the total number of spatial streams for the plurality of target stations is set to seven (7) or eight (8); and a transmission unit configured to transmit the VHT-LTF symbols to the plurality of target stations, wherein the mapping matrix P is determined by:

$$P = \begin{bmatrix} P_{4\times 4} & P_{4\times 4} \\ P_{4\times 4} & -P_{4\times 4} \end{bmatrix},$$

and wherein $P_{4\times 4}$ is determined by $$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

and wherein the first seven rows of the mapping matrix P are applied when the total number of spatial streams for the plurality of target stations is set to seven (7).

6. The transmitter of claim 5, wherein the plurality of VHT-LTF symbols are used to estimate a multiple input multiple output (MIMO) channel of the plurality of target stations.

7. The transmitter of claim 5,
wherein the plurality of target stations include a first target station and a second target station, and
wherein a number of spatial streams for the first target station is different from a number of spatial streams for the second target station.

8. The transmitter of claim 7, wherein VHT-LTF symbols for the first target station are directly followed by VHT-LTF symbols for the second target station.

9. A method of transmitting a training signal in a Wireless Local Area Network (WLAN), the method comprising:
generating, by a transmitting station, Very High Throughput-Long Training Field (VHT-LTF) symbols for a plurality of target stations by applying a mapping matrix P to a VHT-LTF sequence, wherein the mapping matrix P is determined based on a total number of spatial streams for the plurality of target stations, wherein a number of the VHT-LTF symbols is set to four (4) when the total number of spatial streams for the plurality of target stations is set to three (3) or four (4), and wherein a number of the VHT-LTF symbols is set to be the same as a number of columns of the mapping matrix P when the total number of spatial streams for the plurality of target stations is set to three (3), four (4), seven (7) or eight (8); and transmitting, by the transmitting station, the VHT-LTF symbols to the plurality of target stations, wherein, when the total number of spatial streams for the plurality of target stations is set to seven (7) or eight (8), the mapping matrix P is determined by:

$$P = \begin{bmatrix} P_{4\times 4} & P_{4\times 4} \\ P_{4\times 4} & -P_{4\times 4} \end{bmatrix},$$

and wherein $P_{4\times 4}$ is determined by:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

wherein the first seven rows of the mapping matrix P are applied when the total number of spatial streams for the plurality of target stations is set to seven (7), wherein, when the total number of spatial streams for the plurality of target stations is set to three (3) or four (4), the mapping matrix P is determined by $P_{4\times 4}$, and wherein the first three rows of the mapping matrix P are applied when the total number of spatial streams for the plurality of target stations is set to three (3).

10. The method of claim 9, wherein the plurality of VHT-LTF symbols are used to estimate a multiple input multiple output (MIMO) channel of the plurality of target stations.

* * * * *